Mar. 20, 1923. 1,449,237.
J. P. MALOY.
CUTTER HEAD.
FILED FEB. 10, 1922.
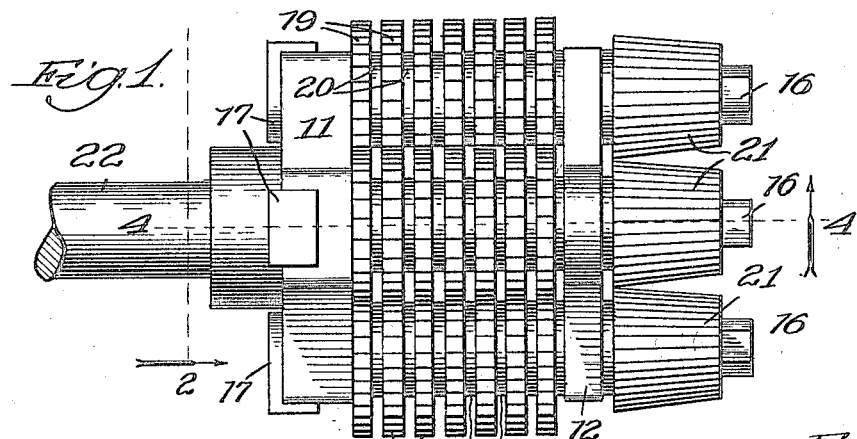
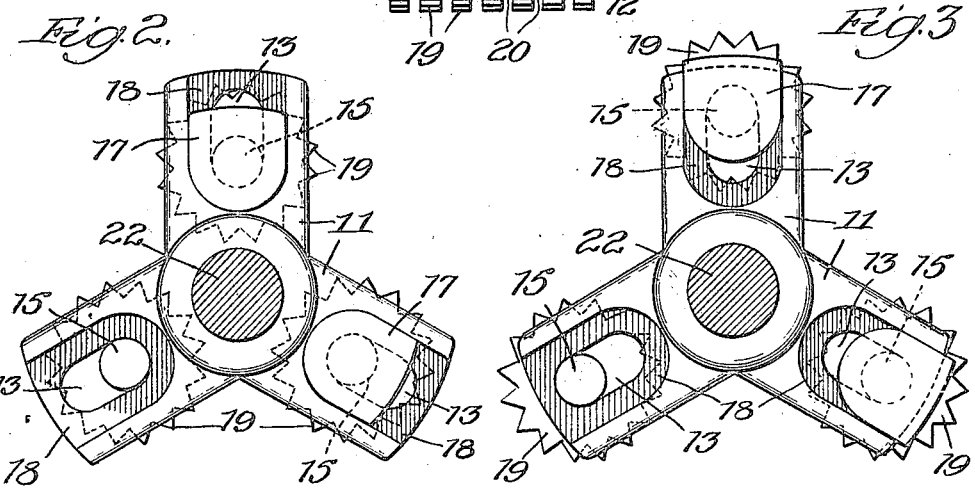
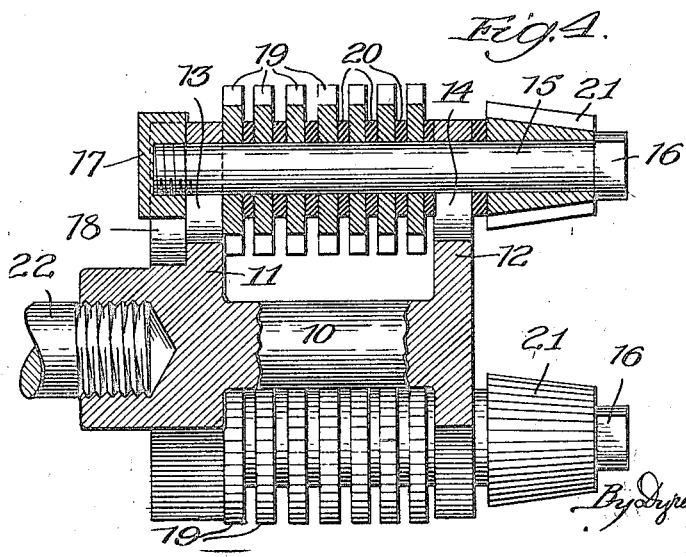
Inventor:
James P. Maloy, Patented Mar. 20, 1923.

1,449,237

UNITED STATES PATENT OFFICE.

JAMES P. MALOY, OF CHICAGO, ILLINOIS, ASSIGNOR TO CHICAGO ENGINEER SUPPLY COMPANY, OF CHICAGO, ILLINOIS, A CORPORATION OF ILLINOIS.

CUTTER HEAD.

Application filed February 10, 1922. Serial No. 535,520.

*To all whom it may concern:*

Be it known that I, JAMES P. MALOY, a citizen of the United States, residing at Chicago, in the county of Cook and State of Illinois, have invented a new and useful Improvement in Cutter Head, of which the following is a specification.

This invention relates to cutter heads for boiler tube cleaners and the like and is fully described in the following specification and shown in the accompanying drawings, in which:

Figure 1 is a top plan view of the invention;

Fig. 2 is an end elevation viewed on the line 2 of Fig. 1 showing the cutting members in retracted position;

Fig. 3 is the same but showing the cutting members in expanded position; and,

Fig. 4 is a section on the line 4—4 of Fig. 1.

The embodiment illustrated consists of a body portion having a narrowed central stem 10 at the ends of which are flanges 11 and 12 each of which is preferably composed of three equally spaced arms, two sets of arms being arranged in alignment and having aligning slots 13 and 14 respectively therein.

A pin or threaded bolt 15 passes through each pair of aligning slots and has a head 16 on one end and is threaded at the opposite end and screwed into a nut 17. This nut is slidably mounted in a groove 18 which is formed in the arm 11 and parallel to the elongated slot 13.

A series of cutters 19 are rotatably mounted on the pin 15 and these are preferably separated by washers or spacers 20. A conical cutter 21 is also preferably mounted on the outer end of the pin 15.

The body of the cutter is threaded at the left hand end as shown in Fig. 4 and screwed upon a driving shaft 22 which is driven by any suitable form of motor (not shown) in a well known manner.

The direction of the threads on the pin 15 and the shaft 22 is such that the rotation of the cutter head tends always to tighten these threads, the nuts 17 are held from turning in the slots 18 while the pins 15 are free to turn except for the fact that they bottom in the nuts 17. At this time the cutters 19 and 21 are freely rotatable on the pin 15 and the pin itself is free to move readily inwardly or outwardly in the slots 13 and 14 under the actions of gravity and centrifugal force.

It will be understood from the foregoing that the cutters may be inserted in a tube in a more or less collapsed condition as shown in Fig. 2 and that as the motor is started centrifugal action will cause them to fly outwardly until they come into contact with the lime deposit which is incrusted therein. As this deposit is cut away the cutters will automatically expand until the boiler tube itself is reached.

While I have shown and described but a single embodiment of my invention, it is to be understood that it is capable of many modifications. Changes, therefore, in the construction and arrangement may be made which do not depart from the spirit and scope of my invention as disclosed in the appended claims in which it is my intention to cover all novelty inherent therein as broadly as possible in view of the prior art.

What I claim as new and desire to secure by Letters Patent is:

1. A cutter head for boiler flue cleaners and the like comprising a body portion having spaced flanges having radial slots formed therein, a plurality of pins, each passing through a pair of aligning slots, rotary cutters journalled on said pins, and means guided in the outer surface of the body portion for retaining each of said pins loosely in said slots, so as to permit said pins to move outwardly under the action of centrifugal force.

2. A cutter head for boiler flue cleaners and the like comprising a body portion having spaced flanges having radial slots formed therein, a plurality of pins, each passing through a pair of aligning slots, rotary cutters journalled on said pins, one of said cutters being journalled on the overhanging end of each pin beyond said flange, and means guided in the body portion and prevented from rotating therein for retaining each of said pins loosely in said slots, so as to permit said pins to move outwardly under the action of centrifugal force.

3. A cutter head for boiler flue cleaners and the like comprising a body portion having spaced flanges having radial slots formed therein, a plurality of pins having a threaded end, each passing through a pair of aligning slots, rotary cutters journalled on said pins, and a nut on said threaded end and guided in the body portion and prevented from rotating therein for retaining each of said pins loosely in said slots, so as to permit said pins to move outwardly under the action of centrifugal force.

4. A cutter head for boiler flue cleaners and the like comprising a body portion having spaced flanges, radial slots formed in said flanges, a plurality of pins, each passing through a pair of aligning slots, rotary cutters journalled on said pins, and nuts guided in the body portion and prevented from turning therein, said pins being threaded and screwed into said nuts, so as to tighten the pins in the nuts as the cutter head revolves, said pins being movable radially outward under the action of centrifugal force.

5. A cutter head for boiler flue cleaners and the like comprising a body portion having spaced flanges having radial slots formed therein, a plurality of pins each having a threaded end and each passing through a pair of aligning slots, rotary cutters journalled on said pins, one of said cutters being journalled on the overhanging end of each pin, beyond said flange, and a nut on said threaded end and guided in the body portion and prevented from rotating therein for retaining each of said pins loosely in said slots, so as to permit said pins to move outwardly under the action of centrifugal force.

JAMES P. MALOY.